Patented Oct. 5, 1948

2,450,451

UNITED STATES PATENT OFFICE 2,450,451

POLYMERIZATION OF ETHYLENE

Louis Schmerling, Riverside, Ill., assignor to Universal Oil Products Company, Chicago, Ill., a corporation of Delaware No Drawing. Application May 31, 1946,
Serial No. 673,610

17 Claims. (Cl. 260—94)

This invention relates to the production of ethylene polymers. It is more specifically concerned with the catalytic polymerization of ethylene in the presence of saturated hydrocarbon diluents and certain metals.

The use of saturated hydrocarbon diluents containing three or more carbon atoms in the peroxide catalyzed polymerization of ethylene results in higher yields and a product of lower molecular weight than are obtained when solvents such as aromatic hydrocarbons and alcohols are employed. I have now found that when certain metals are used in conjunction with the saturated hydrocarbon diluent, even higher yields are obtained and the melting point of the polymer is increased considerably. This effect is obtained only with saturated hydrocarbon diluents and not with other solvents.

In one embodiment my invention relates to a polymerization process which comprises subjecting ethylene to the action of an organic peroxide polymerization catalyst at polymerizing conditions in the presence of a saturated hydrocarbon diluent containing at least three carbon atoms and a metal selected from the group consisting of magnesium, zinc, cadmium, and mercury.

The ethylene charged to my process may be obtained from any source, such as the oxidation of ethane, the dehydration of ethyl alcohol, and particularly the thermal or catalytic cracking of higher boiling hydrocarbons. Many of the known processes for polymerizing ethylene require a highly purified charge stock, i. e., the ethylene has to be substantially free from other hydrocarbons and from dissolved oxygen. In contrast, the yield and quality of the polymer produced in my process are substantially unaffected by the presence of other hydrocarbons, such as ethane, or by the presence of dissolved oxygen. Thus a refinery ethane-ethylene fraction may be charged to the process of this invention together with a suitable catalyst and a saturated hydrocarbon diluent containing more than two carbon atoms. The olefin is converted to a polymer thereof in good yields and the ethane in the product is simply and inexpensively separated from the polymer. There is no need for a costly charge stock purification step and, as a result, the capital and operating costs of the process are considerably reduced.

The diluent used in the present process may be any saturated hydrocarbon containing three or more carbon atoms or a mixture of such hydrocarbons. The preferred saturated hydrocarbons contain four or more carbon atoms; for the latter are more effective than those containing three carbon atoms. Unlike saturated hydrocarbons containing three or more carbon atoms, the use of ethane or methane as diluents in my process result in no enhanced yields. The saturated hydrocarbons mentioned herein comprise normal paraffins, such as normal butane, isoparaffins, such as isopentane, cycloparaffins, such as cyclohexane, and alkylcycloparaffins, such as methylcyclohexane. I am aware that certain substances, such as benzene, toluene, and methanol, have been suggested as solvents for this reaction. However, the use of saturated hydrocarbons gives unexpectedly better yields than any of the compounds suggested, particularly when certain metallic promoters are used, and makes possible the polymerization of ethylene at lower temperatures and pressures than usually are possible when using aromatic or alcoholic solvents. Furthermore, the saturated hydrocarbons act as diluents rather than solvents as shown by the fact that enhanced yields are obtained when ethylene is polymerized in the presence of propane and of isobutane at temperatures above the critical for these two substances.

The catalysts which may be used in the present process comprise those organic peroxides which catalyze the polymerization of ethylene. These substances include peracetic acid, diacetyl peroxide, toluic acid peroxide, oleic peroxide, benzoyl peroxide, tertiary butyl perbenzoate, ditertiary butyl peroxide, hexyl peroxide, tertiary butyl hydroperoxide, and methylcyclohexylhydroperoxide.

The metallic promoters that may be used in the present process consist of magnesium and the members of the B subgroup of group II of the periodic table, namely zinc, cadmium, and mercury. These promoters may be added to the reaction zone in their elemental state or in the form of a compound which, under the conditions prevailing in the reaction zone, decomposes to yield the metal. The potency of these promoters is dependent in part upon their physical form, particularly the surface area per unit weight, and it is often preferable to add them in a finely divided state. These metals are specific in their action; for the beneficial effect of the added metal is not obtained when solvents such as methanol or benzene are used instead of saturated hydrocarbons containing three or more carbon atoms. More than this, other metals such as molybdenum, silver, lead, and iron have relatively little effect on the polymerization reaction conducted in the presence of saturated hydrocarbon diluents. Nickel causes a marked decrease in the yield of polymer and copper substantially completely inhibits the reaction.

The process of my invention may be carried out in batch operation by placing a quantity of the saturated hydrocarbon diluent, the metallic promoter, and the catalyst in a reactor equipped with a mixing device, adding the ethylene, heating to a reaction temperature while mixing the contents of the reactor, cooling after a suitable period of time, and recovering the polymer.

The preferred method of operation is of the continuous type. In this method of operation the ethylene, diluent, promoter, and catalyst are continuously charged to a reactor maintained under suitable conditions of temperature and pressure. The reactor may be an unpacked vessel or coil or it may contain an adsorbent packing material, such as fire brick, alumina, dehydrated bauxite, and the like, upon which the catalyst is deposited and retained. Instead of charging the metal to the reaction zone together with the other reactants, the metal may be placed in the reactor and the ethylene and the solution of peroxide in the diluent may be passed over it. The polymer is separated from the reactor effluent. The diluent and unconverted ethylene may be recycled to the reaction zone. The reaction temperature can be controlled to an appreciable degree by adjusting the amount of diluent charged to the process. The diluent absorbs the heat liberated during the reaction and thus prevents excessive temperature rises.

Another mode of operation that may be used is the fluidized type wherein the charge is passed upwardly through a bed of finely divided adsorbent material, thereby causing the particles to become motionalized and forming a fluid-like mass. A portion of the adsorbent may be continuously withdrawn from the reaction zone, cooled, and returned thereto; thus providing an efficient method of removing the heat of reaction.

Instead of separately adding the peroxide catalyst to the reaction zone, I have found that it frequently is more desirable and economical to form the catalyst in situ in the diluent and then charge the resulting solution to the reaction zone together with the ethylene. Formation of the peroxide in the saturated hydrocarbon may be accomplished by autoxidation, i. e., by heating the hydrocarbon while air is bubbled through it, preferably in the presence of a trace of peroxide formed in a previous autoxidation. Alternatively, the air may be passed through the hydrocarbon in the presence of an oxidation catalyst such as manganese stearate. In some cases it will be beneficial to add a minor amount of olefinic or cycloolefinic hydrocarbons to the saturated hydrocarbon before passing air through it.

In the continuous methods of carrying out my process, the catalyst preferably is added continuously to the reaction zone, but, if desired, it may be added intermittently, particularly when a packing material which retains catalyst is employed in the reactor.

The temperature employed in the process of this invention should be at least as high as the initial decomposition temperature of the peroxide used as the catalyst. In the case of tertiary butyl perbenzoate for example, the decomposition temperature is approximately 115° C. Higher temperatures may be employed but little advantage is gained if the temperature is more than about 150° C. higher than the decomposition temperature of the catalyst. The general effect of increasing the temperature is to accelerate the rate of reaction, but the increased reaction rate is accompanied by a decrease in the molecular weight of the polymer. Thus by choosing a temperature within the indicated range, polymers varying from semi-solids to liquids may be obtained.

In contrast to many of the prior art processes, pressures as low as 15 atmospheres may be employed with good results in my process. Pressures as high as 500 atmospheres may be used, but the preferred range is from about 30 to about 100 atmospheres. In general, the molecular weight of the polymer increases with increasing pressure.

The concentration of catalyst utilizable in my process can vary over a wide range. For reasons of economy, it generally is desirable to use low concentrations of catalysts such as from about 0.1% to about 4% of the ethylene charged. Higher concentrations of catalyst result in lower molecular weight polymers and if such products are desired they may be prepared by using catalyst concentrations up to 15% or more.

In batch operation and in flow operations that do not employ packing materials, the contact time should be in the range of from about 3 minutes to about 6 hours. However, contact times of at least 10 minutes usually are preferred. In fixed bed operation the space velocity, defined as the volume of liquid charge per hour divided by the superficial volume of the packing should be in the range of about 0.1 to about 10.

The ratio of diluent to ethylene charged to the reaction zone may vary over a relatively broad range. In general, the conversion of ethylene to polymer increases, but at a decreasing rate, as the weight ratio of diluent to ethylene is increased. A 1:1 ratio is satisfactory, but economic and operating considerations may dictate the use of higher or lower ratios.

The amount of promoter needed to obtain a given improvement will depend to some extent upon the surface area per unit weight of said promoter. That is, the more finely divided the metal is, the less that is required for a given effect. In general, the most satisfactory results are obtained when the weight of metal charged to the reactor is approximately equal to or somewhat greater than the weight of catalyst charged.

The following examples are given to illustrate my invention but they are not introduced with the intention of unduly limiting the generally broad scope of said invention. The experiments given under the examples were carried out by heating the reactants in glass liners in a rotating autoclave for four hours. Unless otherwise noted, the charge was 3 g. of peroxide, 50 g. of diluent, 10 g. of metal, and 40 atmospheres of initial ethylene pressure, which is equivalent to approximately 40 g. of ethylene.

EXAMPLE I

*Effect of metal*

The data given below were obtained in experiments conducted at 115° C. using tertiary butyl perbenzoate as the catalyst and methylcyclohexane as the saturated hydrocarbon diluent.

| Metal | None | Cu | Mo | Ag | Pb | Mg | Zn | Cd [3] | Hg |
|---|---|---|---|---|---|---|---|---|---|
| Polymer: | | | | | | | | | |
| Weight, g | 24 | 3 | 18 | 20 | 26 | 35 | 30 | 36 | 35. |
| Consistency | Greaselike | Semi-Crystalline | Greaselike | Greaselike | Greaselike | Wax | Hard wax | Wax | Wax. |
| Melting Point, °C [2] | 81 | ([1]) | 69 | 81 | 71 | 91 | 95 | 88 | 88. |

[1] Not determined, chiefly copper salt.
[2] A. S. T. M. Test Method D127-30.
[3] Bar of cadmium (66 g.) used.

It can be seen that the use of magnesium, zinc, cadmium, and mercury resulted in increased yields of a polymer of higher molecular weight than that obtained in the absence of added metal. The other metals shown in the table either had substantially no effect upon the yields and melting point of the polymer or they brought about decreases therein.

EXAMPLE II

*Effect of diluent*

The importance of the type of diluent used in conjunction with the metallic promoter is shown by the following data obtained in experiment made at 115° C. using tertiary butyl perbenzoate as the catalyst.

| Diluent | Methanol | | Benzene | | Methylcyclohexane | | Isobutane | |
|---|---|---|---|---|---|---|---|---|
| Metal | None | Hg | None | Hg | None | Hg | None | Hg |
| Polymer: | | | | | | | | |
| Weight, g | 7 | 8 | 15 | 15 | 24 | 35 | 23 | 28 |
| Melting Point, °C [1] | 85 | 86 | 95 | 90 | 81 | 88 | 83 | 96 |

[1] A. S. T. M. Test Method D127-30.

It can be seen that an increased yield and molecular weight of the polymer was obtained only when saturated hydrocarbon diluents were used and not when methanol and benzene were employed as the solvents.

I claim as my invention:

1. A polymerization process which comprises subjecting ethylene to the action of an organic peroxide polymerization catalyst at polymerizing conditions, including a temperature at least as high as the decomposition temperature of said catalyst, in the presence of a saturated hydrocarbon diluent containing at least three carbon atoms and a metal selected from the group consisting of magnesium, zinc, cadmium, and mercury.

2. A process for producing polymers from ethylene which comprises subjecting ethylene to the action of an organic peroxide polymerization catalyst at a pressure above about 15 atmospheres, a temperature of from about the decomposition temperature of the catalyst to about 150° C. higher than said decomposition temperature, and in the presence of a saturated hydrocarbon diluent containing at least three carbon atoms and a metal selected from the group consisting of magnesium, zinc, cadmium, and mercury.

3. The process of claim 2 further characterized in that the saturated hydrocarbon diluent is an aliphatic paraffin.

4. A process for producing polymers from ethylene which comprises subjecting ethylene to the action of an organic peroxide polymerization catalyst at a pressure above about 15 atmospheres, a temperature of from about the decomposition temperature of the catalyst to about 150° C. higher than said decomposition temperature and in the presence of a cycloparaffin and a metal selected from the group consisting of magnesium, zinc, cadmium, and mercury.

5. The process of claim 4 further characterized in that the cycloparaffin is methylcyclohexane.

6. A polymerization process which comprises subjecting ethylene to the action of a hydrocarbon peroxide polymerization catalyst at a temperature at least as high as the decomposition temperature of the latter, said catalyst being dissolved in a saturated hydrocarbon diluent containing at least three carbon atoms and a metal selected from the group consisting of magnesium, zinc, cadmium, and mercury, and said catalyst having been produced by oxidizing a portion of said diluent.

7. A process for producing polymers of ethylene which comprises subjecting ethylene to the action of a hydrocarbon peroxide polymerization catalyst dissolved in a saturated hydrocarbon diluent containing at least three carbon atoms and a metal selected from the group consisting of magnesium, zinc, cadmium, and mercury at a pressure above about 15 atmospheres and a temperature of from about the decomposition temperature of the catalyst to about 150° C. higher than said decomposition temperature, said catalyst having been produced by oxidizing a portion of said diluent.

8. The process of claim 7 further characterized in that the saturated hydrocarbon diluent is an aliphatic paraffin.

9. The process of claim 7 further characterized in that the saturated hydrocarbon diluent is a cycloparaffin.

10. The process of claim 7 further characterized in that the saturated hydrocarbon diluent is methylcyclohexane.

11. The process of claim 2, further characterized in that said catalyst comprises tertiary butyl perbenzoate.

12. The process of claim 2 further characterized in that said metal comprises mercury.

13. The process of claim 2 further characterized in that said metal comprises cadmium.

14. The process of claim 2 further characterized in that said metal comprises zinc.

15. The process of claim 2 further characterized in that said catalyst comprises di-tertiary butyl peroxide.

16. A process for producing ethylene polymers which comprises polymerizing ethylene in the presence of a hydrocarbon peroxide polymerization catalyst dissolved in a saturated hydrocarbon diluent having at least three carbon atoms per molecule at a temperature at least as high as the decomposition temperature of said catalyst and in the further presence of a promoter metal selected from the group consisting of magnesium, zinc, cadmium and mercury.

17. The process of claim 16 further characterized in that said hydrocarbon peroxide catalyst is formed in said saturated hydrocarbon diluent by oxidation of a portion of the diluent.

LOUIS SCHMERLING.

REFERENCES CITED

The following references are of record in the file of this patent:

UNITED STATES PATENTS

| Number | Name | Date |
|---|---|---|
| 1,981,819 | Wiezevich et al. | Nov. 20, 1934 |
| 2,334,195 | Hopff et al. | Nov. 16, 1943 |
| 2,395,292 | Peterson et al. | Feb. 19, 1946 |
| 2,396,677 | Brubaker | Mar. 19, 1946 |